(12) United States Patent
Wilson et al.

(10) Patent No.: US 6,506,955 B1
(45) Date of Patent: Jan. 14, 2003

(54) DECONTAMINATION METHOD

(75) Inventors: David W. Wilson, Pasco, WA (US);
Ronald Morris, Fountain Inn, SC (US);
Peter M. Newton, Richland, WA (US);
Gregory D. Paul, Kennewick, WA (US); Thomas J. Gammon, Richland, WA (US); John Michael Parke, Kennewick, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/568,434

(22) Filed: May 10, 2000

Related U.S. Application Data
(60) Provisional application No. 60/134,422, filed on May 17, 1999.

(51) Int. Cl.[7] ................................................. G21F 9/00
(52) U.S. Cl. ........................................................... 588/1
(58) Field of Search .................... 588/1; 976/DIG. 375, 976/DIG. 376

(56) References Cited

U.S. PATENT DOCUMENTS

| | | | | |
|---|---|---|---|---|
| 4,476,047 A | * | 10/1984 | Bonnici et al. | ............. 252/626 |
| 5,515,407 A | * | 5/1996 | Bevilacqua et al. | ........ 376/372 |

* cited by examiner

Primary Examiner—Steven P. Griffin
Assistant Examiner—Eileen E. Nave

(57) ABSTRACT

A boiling water reactor is chemically decontaminated by circulating a decontamination solution through reactor recirculation loops and the annulus region of a reactor pressure vessel that surrounds the central core region while bypassing the central core region. The decontamination solution may also be circulated between the annulus region and a lower internals region while bypassing the central core region. The solution dissolves or breaks down metal oxide layers on the surfaces of the boiling water reactor. The metal oxide layers in the central core region and the activated metal ions contained in these layers, which do not substantially contribute to personnel exposure, are not released and, therefore, do not need to be removed from the solution.

11 Claims, 4 Drawing Sheets

DECONTAMINATION METHOD

CROSS-REFERENCE

This application claims the benefit of Provisional Patent Application No. 60/134,422, filed May 17, 1999.

BACKGROUND OF THE INVENTION

The invention relates to a method for decontaminating nuclear reactors employed to generate electric power and more particularly to a method for performing full system decontaminations on boiling water reactors.

During on-line power generating operations of commercial boiling water nuclear reactors, thin layers of metal oxides tend to build up on the internal surfaces of vessels and other components and piping in contact with circulating primary coolant (essentially high temperature water). Activated metal ions in the central core regions in reactor pressure vessels are entrained in the primary coolant and then are absorbed in the metal oxides, which results in relatively high radiation levels on these surfaces. It is desirable to reduce the radiation levels to "As Low As Reasonably Achievable" levels in order to reduce the exposure of personnel working near the reactors during periodic plant outages and/or plant decommissioning operations. Thus, the industry may employ one or a combination of various known chemical decontamination treatments, e.g., acid permanganate, alkaline permanganate, Citrox, CANDEREM, LOMI and/or other processes, in order to dissolve or break up the oxide films. Conventionally, these decontamination processes involve the addition of permanganate, oxalate, citrate, EDTA and/or other ions to the primary coolant to form decontamination solutions and then the circulation of the solutions through the components to be decontaminated. In addition to removing the oxide layers, it may be desirable to remove several microns of base metal in order to better protect personnel during decommissioning processes. Dilute chemical decontamination solutions generally contain less than about 3–5% by weight of such decontamination agents. Chemical decontaminations may be performed upon full primary coolant systems or upon selected subsystems. Full system decontaminations are the preferred approach when the goal is to reduce dose rates on multiple subsystems throughout the plants. In addition, full system decontamination processes are generally performed with nuclear fuel assemblies out of the central core regions of the reactor pressure vessels, but the fuel assemblies may be retained in the central core regions in some cases.

The activated metal ions that are removed from the internal surfaces of the primary coolant systems in the course of the decontamination operations are collected on cation exchange resins. The activated resins must then be removed to remote disposal sites.

The majority of the activated oxide deposits in boiling water reactor primary coolant systems are located in the central core regions of reactor pressure vessels. These deposits do not substantially contribute to personnel exposure. Thus, it would be very desirable to decontaminate only those systems that substantially contribute to personnel exposure and bypass the central core regions. This would substantially reduce the total exposure of personnel while reducing resin and disposal costs.

SUMMARY OF THE INVENTION

It is an object of the present invention to decontaminate a portion of a reactor pressure vessel in a boiling water reactor and its appurtenant recirculation system while bypassing its central core region. It is a further object to substantially decontaminate a boiling water reactor with lower overall personnel exposures to radiation and lower resin costs.

With these objects in view, the present invention resides in a method of decontaminating a boiling water reactor having a plurality of reactor recirculation loops hydraulically connected in parallel with a reactor pressure vessel. Such a reactor pressure vessel has: a central core region; an annulus region surrounding the central core region and in hydraulic communication with the recirculation loops; and a lower internals region in hydraulic communication with the central core region. In the practice of the present invention, a decontamination solution is circulated through at least one of the reactor recirculation loops and the annulus region of the pressure vessel without circulating through the central core region. In a preferred practice of the present invention, the decontamination solution also circulates between the annulus region and the lower internals region without circulating through the central core region. Thus, a boiling water reactor can be substantially decontaminated while reducing overall personnel exposure and generating less resin wastes.

BRIEF DESCRIPTION OF THE DRAWINGS

The invention as set forth in the claims will become more apparent from the following detailed description of certain preferred practices thereof, which may be performed in boiling water reactors shown, by way of example only, in the accompanying drawings, wherein:

DESCRIPTION OF THE PREFERRED EMBODIMENT

Figure 1:
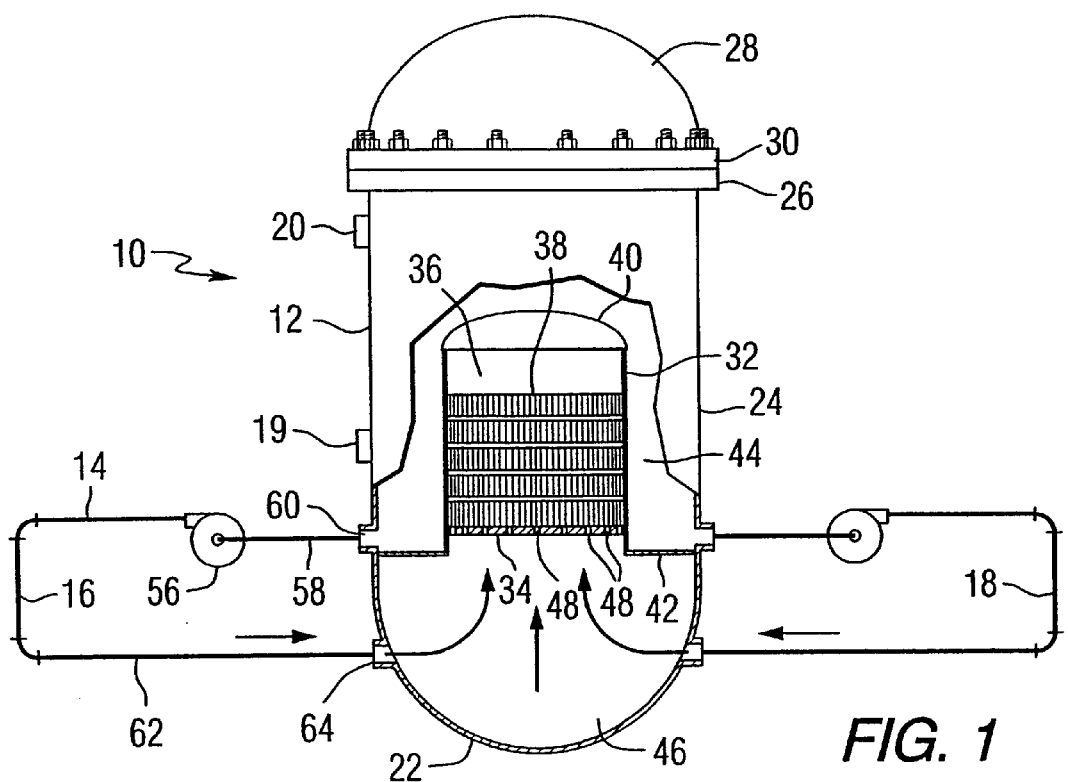
FIG. 1 is a schematic representation of a boiling water reactor, including a reactor recirculation system comprising a plurality of reactor recirculation loops connected in parallel with a reactor pressure vessel.

Referring now to the drawings in detail and in particular to FIG. 1 there is generally shown a boiling water reactor 10 of a nuclear power plant for commercially generating electricity. The reactor 10 generally includes a reactor pressure vessel 12 and a reactor recirculation system 14. The reactor recirculation system 14 generally comprises a plurality of reactor recirculation loops, illustrated by loops 16 and 18, hydraulically connected in parallel with the reactor pressure vessel 12. When generating power during normal online operations, primary coolant (high purity water containing ppm levels of various ions and, in some cases, dissolved hydrogen gas) is pumped by feedwater pumps (not shown) into the reactor pressure vessel 12 through an inlet nozzle 19 and steam is generated with the reactor pressure vessel 12. The steam flows out of the pressure vessel 12 through an outlet nozzle 20 and then to a turbine (not shown) which generates the electrical power. The reactor recirculation system 14 facilitates the flow of primary coolant to fuel assemblies in the central core regions in the pressure vessel 12. A commercial facility embodying this boiling water reactor design is the Oyster Creek Plant near Forked River, N.J.

The reactor pressure vessel 12 includes a bottom head 22 with a sidewall 24 extending vertically to a flange 26. A removable head 28 has a flange 30 that may be bolted to the reactor pressure vessel flange 26. The reactor pressure vessel 12 has a core shroud 32 and a core plate 34, which define a central core region 36 for containing removable fuel assemblies 38. The core shroud 32 has a removable upper end 40 that may be removed in order to remove the fuel assemblies 38. The core shroud 32 (or, equivalently, in a similar reactor design, a supporting skirt [not shown] supporting the core shroud 32) is spaced from the reactor pressure vessel wall 24 by a structural ring member 42. The pressure vessel wall 24, core shroud 32 and ring member 42 define an annulus region 44 surrounding the central core region 36. The annulus region 44 frequently is referred to as a "downcomer" or a "downcomer annulus". The reactor pressure vessel bottom head 22 and the core plate 34 define a lower internals region 46 which is in fluid flow communication with the central core region 36 via flow holes 48 in the core plate 34.

Each reactor circulation loop 16 and 18 of the reactor circulation system 14 shown in FIG. 1 generally includes a centrifugal pump 56 with a pump suction nozzle and a pump discharge nozzle. The pump 56 may have a nominal capacity of up to about 50,000 gallons per minute or more. The pump suction nozzle is connected with piping 58 extending from one or more nozzles, illustrated by nozzle 60 in FIG. 1, in the pressure vessel wall for fluid flow connection with the annulus region 44. The pump discharge nozzle is connected with piping 62 extending to one or more nozzles, illustrated by nozzle 64, in the pressure vessel wall 24 for fluid flow connection with the lower internals region 46 of the reactor pressure vessel 12.

When generating power during normal online operations, the primary coolant pumped through the inlet nozzle 19 into the annulus region 44 flows through the recirculation system 14, into the lower internals region 46, up through flow holes 48 in the core plate 34 and fuel assemblies 38 in the central core region 36 (where steam is generated) and up through steam/condensate separators (not shown) supported on the core shroud head 40. The separated condensate drains back to the annulus region 44. The steam flows up into the upper portion of the reactor pressure vessel 12, through steam dryers (not shown) and then out of the pressure vessel 12 through outlet nozzle 20.

Figure 2:
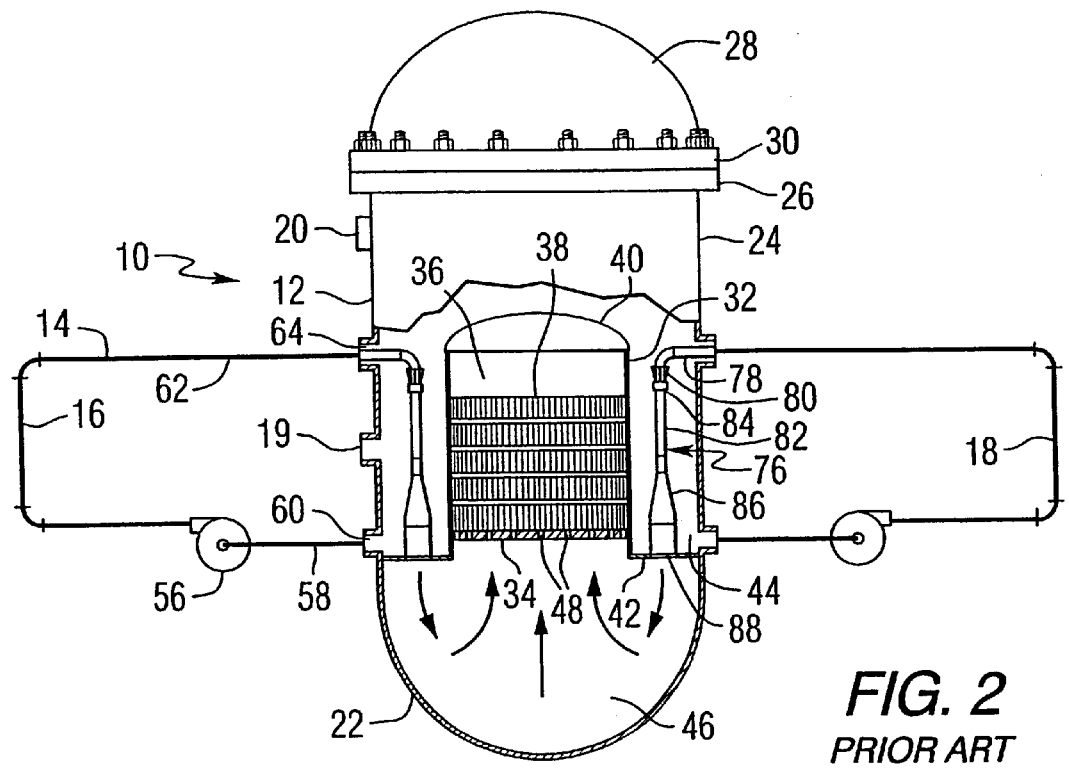
FIG. 2 is a schematic representation of a boiling water reactor, including another reactor recirculation system comprising a plurality of reactor recirculation loops connected in parallel with a reactor pressure vessel and having jet pumps disposed in the reactor pressure vessel.

FIG. 2 shows a different boiling water reactor design which employs internal jet pump assemblies 76 disposed in the annulus region 44 in the reactor circulation loops 16 and 18 for circulating coolant from the annulus region 44 to the lower internals region 46. Each jet pump assembly 76 includes inlet piping 78 with a jet nozzle 80 in fluid flow communication with one of the reactor recirculation loops 16 or 18. A mixing assembly 82 has a suction inlet end 84 spaced from the jet pump nozzle 80 in fluid flow communication with the annulus region 44. The primary coolant around the suction inlet end 84 in the annulus region 44 is entrained by the primary coolant flowing out through the jet pump nozzle 80 and the two fluids are mixed together in the mixing assembly 82. The mixing assembly 82 is connected with a diffuser assembly 86 having an outlet end 88 in fluid flow communication with the lower internals region 46. U.S. Pat. No. 5,515,407 entitled "Jet Pump Assembly For Recirculating Coolant Through a Recirculation Loop Of A Boiling Water Reactor Vessel" is incorporated by this reference for its detailed description of the structure of such an assembly.

Figure 3:
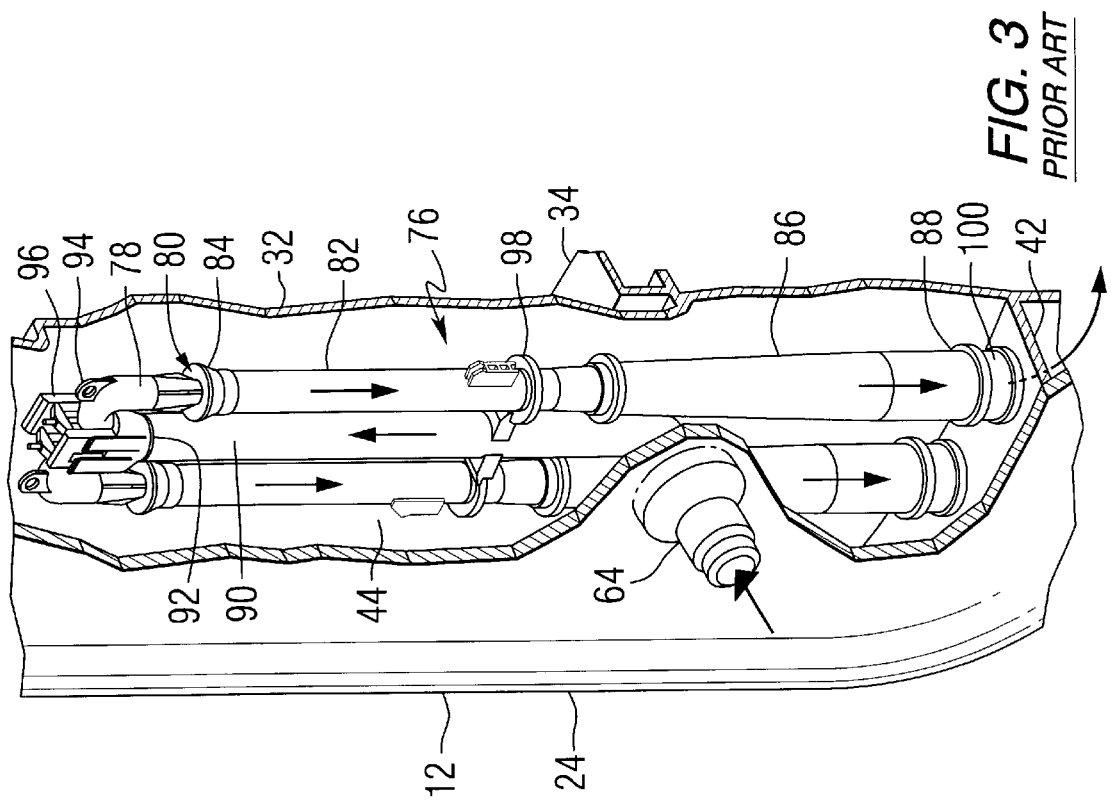
FIG. 3 is a partial perspective schematic representation of the boiling water reactor vessel of FIG. 2 which has been cut-a-way to show a conventional jet pump assembly arrangement.

As is shown in FIG. 3 and as is described in U.S. Pat. No. 5,515,407, jet pump assemblies 76 are conventionally arranged in pairs with an inlet riser pipe 90 extending directly from an inlet nozzle 64 or via a header (not shown) to a header 92 and then to the inlet piping 78, which may be a piping elbow with a lifting eye 94. The assembly comprising the header 92 and the inlet piping 78 to each jet pump assembly 76 is frequently referred to as a "ramshead". The riser pipe 90 and the ramshead are maintained in place by a holddown assembly 96. The mixing assembly 82 and the diffuser assembly 86 are held against the riser pipe 90 by restrainers 98. Also, the diffuser assembly outlet end 88 may be fit into a fitting 100 extending to or through the ring member 42 and to a connector (not shown) for providing primary coolant to the lower internals region 46.

As discussed above, after generating electric power during online operations, it is desirable to decontaminate boiling water reactors and their recirculation systems 14 but not necessarily the central core regions 36. In accepted commercial decontamination processes such as, e.g., the LOMI, CAN-DEREM, CAN-DECON, Citrox and various permanganate processes, low oxidation state metal ions, permanganates, oxalates, citrates, EDTA and other agents are added to the primary coolant to generate a decontamination solution. The decontamination solution is then circulated past the activated surfaces to dissolve and break up the radioactive oxide films that have formed and release the activated metal ions.

In accordance with the practice of the present invention, a decontamination solution is circulated through at least one of the reactor recirculation loops 16 or 18 and the annulus region 44 without circulating the decontamination solutions through the central core region 36. Preferably, the decontamination solutions are circulated through all of the recirculation loops 16 and 18.

FIGS. 4–7 show various modifications to jet pump assemblies 76 of boiling water reactors, such as the paired jet pump assembly arrangement illustrated in FIG. 3, for at least restricting the flow of the decontamination solution from the annulus region 44 into the lower internals region 46 so that the decontamination solution flowing through the annulus 44 and the recirculation system 14 will not circulate through the central core region 36. Preferably, the turbulence in the lower internals region 46 (if any) is sufficiently low that substantial amounts of the decontamination solution will not splash through the holes 48 in the core plate 34 and into the central core region 36 because this could unnecessarily generate additional activated ions in the decontamination solution which would need to be removed and thereby reduce the efficiency of the process.

Figure 4:
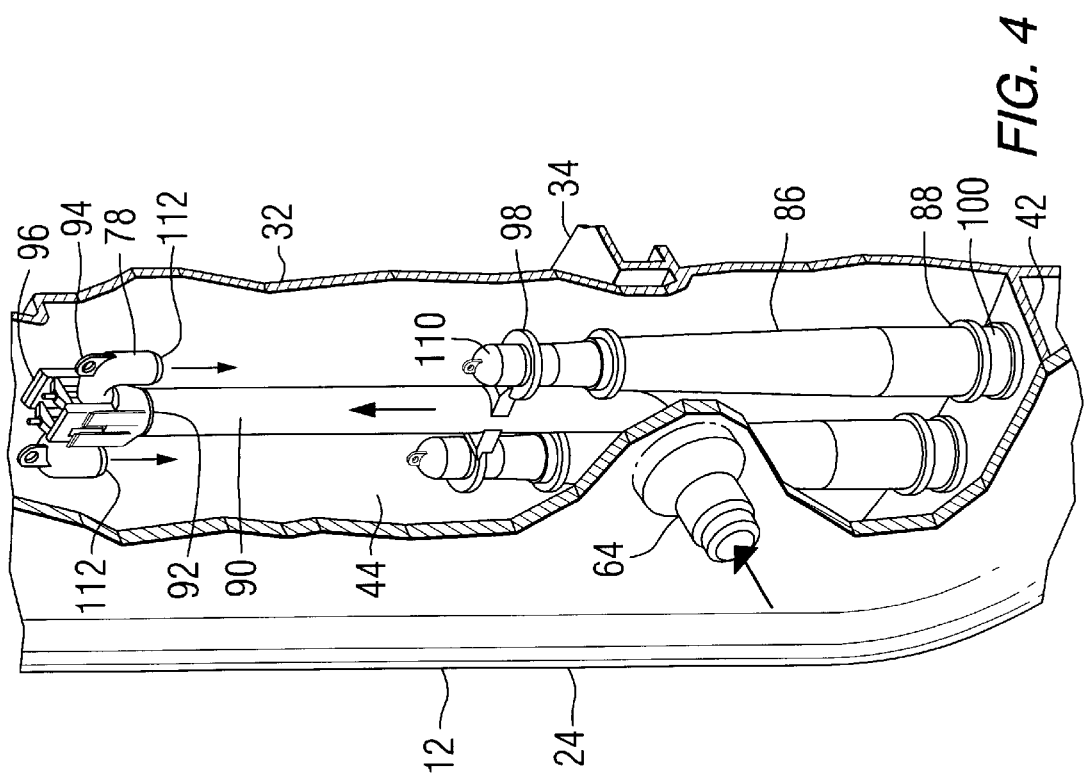
FIG. 4 is a partial perspective schematic representation of the jet pump assembly arrangement of FIG. 3 including a first modification of the jet pump assembly for practicing the present invention.
Figure 5:
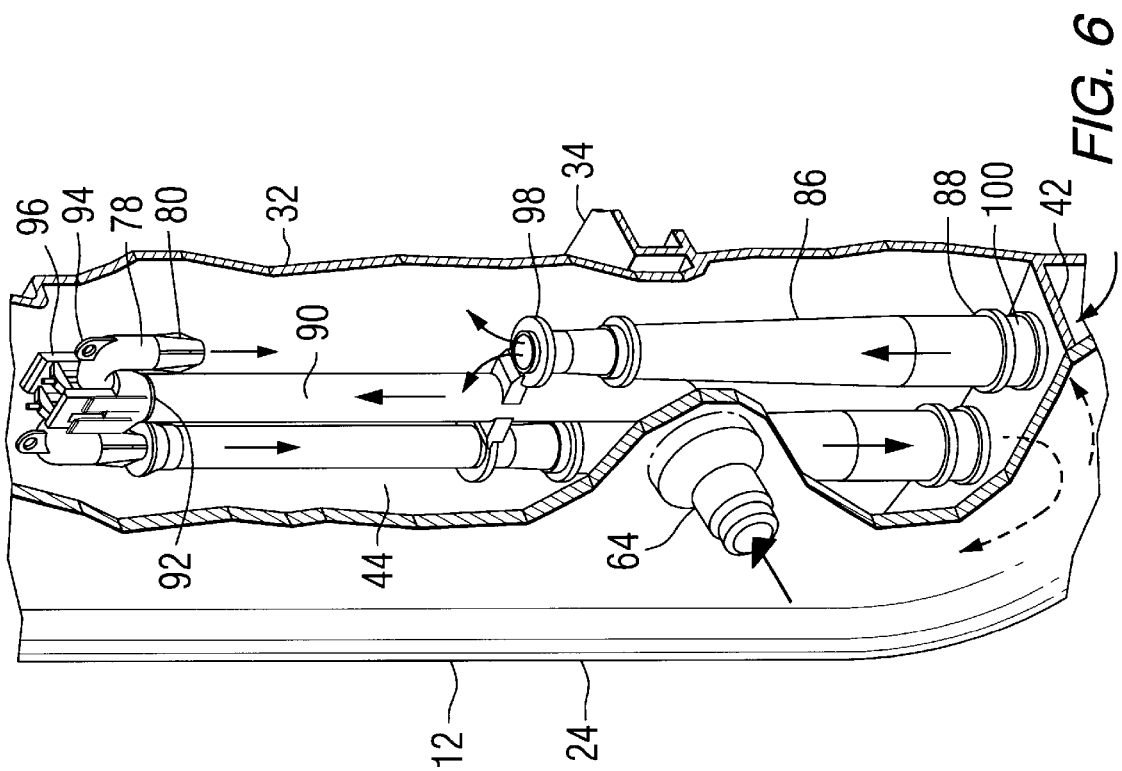
FIG. 5 is a partial schematic representation of the jet pump assembly arrangement of FIG. 3 including a second modification of the jet pump assembly for practicing the present invention.

FIGS. 4 and 5 show modified jet pump assemblies 76 of FIG. 2 fed by a riser pipe 90 from which at least part of each jet pump assembly has been removed. The remaining part of each jet pump assembly 76 in the pressure vessel 12 which is in fluid flow communication with the lower internals region 46 is covered by a cap 110. Each cap 110 may be placed over the remaining part of the jet pump assembly 76 to provide an umbrella type cover that substantially prevents the liquid which may fall or splash from entering into the diffuser assembly 86. A liquid tight cap seal may be employed where the liquid level in the annulus 44 were to be maintained near or above the level of the cap 110 and it is desired to substantially prevent decontamination solution from flowing into the lower internals region 46.

FIG. 4 illustrates a jet pump assembly modification wherein the jet pump nozzles 80 and the mixing assemblies 82 have been removed, e.g., by underwater cutting, and the diffuser assemblies 86 covered by caps 110. Also, as shown, the jet pump nozzles 78 may be removed and adapters 112 such as orifice plates or other flow devices may be welded or attached to the ends of the inlet pipes 92. The adapters 112 may be employed to direct decontamination solution downwardly to avoid creating a geyser in the annulus 44. This can be particularly important to reduce splashing over the core shroud 32 in a decontamination practice where the core shroud head 40 and fuel assemblies 38 are removed. FIG. 5 illustrates another jet pump assembly modification wherein only the suction inlets 84 of the mixing assemblies 82 have been removed and the remaining portions of the mixing assemblies 82 capped.

The flow of decontamination solution in each recirculation loop 16 and 18 usually may be controlled by variable speed circulation pumps 56 or by flow control valves (not shown) to maintain the required net positive suction head (NPSH) of the pumps and to limit vibrations on the temporary adapters 112. Also, the recirculation pumps 56 may be operated at a rate that will provide sufficient energy input into the decontamination solution in order to heat up and maintain the system at a temperature of about 180° F. to about 250° F. for the chemical decontamination agents to be effective in an acceptable period of time. An overpressure with a gas such as air or nitrogen may be provided in the reactor vessel 12 to prevent boiling and to provide the required NPSH. Alternatively, where it is not possible or undesirable to operate the recirculation pumps 56, the Residual Heat Removal Pumps (not shown) or external pumps (not shown) may be employed to circulate the decontamination solution.

Figure 6:
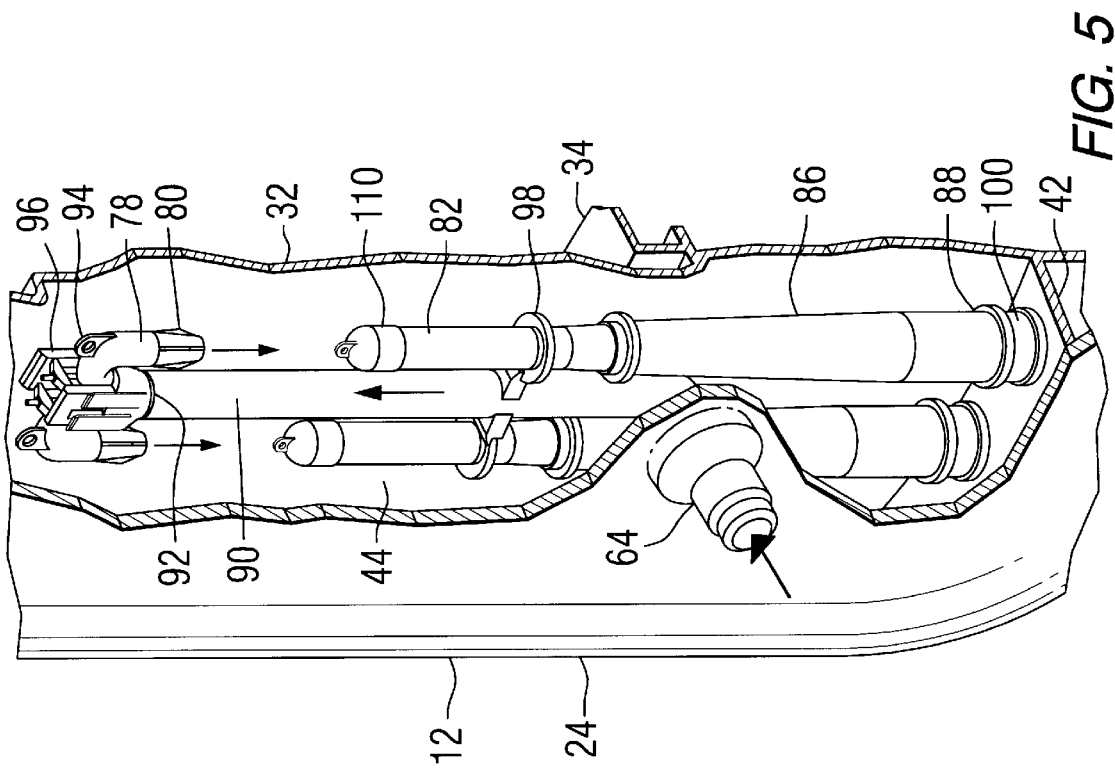
FIG. 6 is a partial schematic representation of the jet pump assembly arrangement of FIG. 3 including a third modification of the jet pump assembly for practicing the present invention.

FIG. 6 illustrates a jet pump assembly modification wherein some of the jet pump assemblies 76 are modified and other assemblies 76 are not modified. This modification permits decontamination solution to be pumped into the lower internals region 46 and circulate upwardly through the remaining parts of the modified assemblies 76 without circulating the solution through the central core region 36. It is noted, however, that substantial turbulence in the lower internals region 46 should be avoided because turbulence may cause some decontamination solution to splash through the core plate 34 depending upon the numbers of assemblies 76 which are modified.

Figure 7:
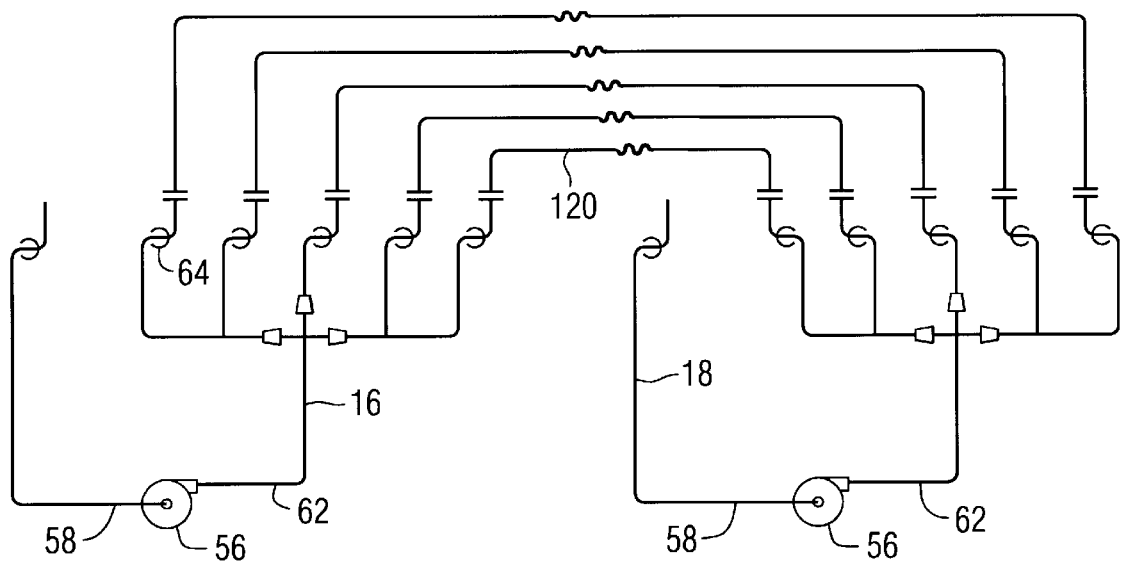
FIG. 7 is a schematic representation of the reactor recirculation system illustrated in FIG. 2 including a fourth modification of the jet pump assembly for practicing the present invention.

FIG. 7 illustrates a piping arrangement where one or more jet pump nozzles 80 of modified jet pump assemblies 76 (as shown in FIG. 6) of one recirculation loop are connected by jumper pipes or hoses 120 with jet pump nozzles 80 of modified jet pump assemblies 76 (as shown in FIG. 6) of another recirculation loop. A recirculation pump 56 of one recirculation loop may then be operated to pump decontamination solution up through riser pipes 90 and headers 92 of the one recirculation loop, through jumpers 120, into headers 92 and down riser pipes 90 of the other recirculation loop, through the other recirculation loop including its recirculation pump (which would not be operating), and into the annulus region 44 of the pressure vessel 12. Advantageously, the flow could be reversed by operating the other recirculation pump 56.

Figure 8:
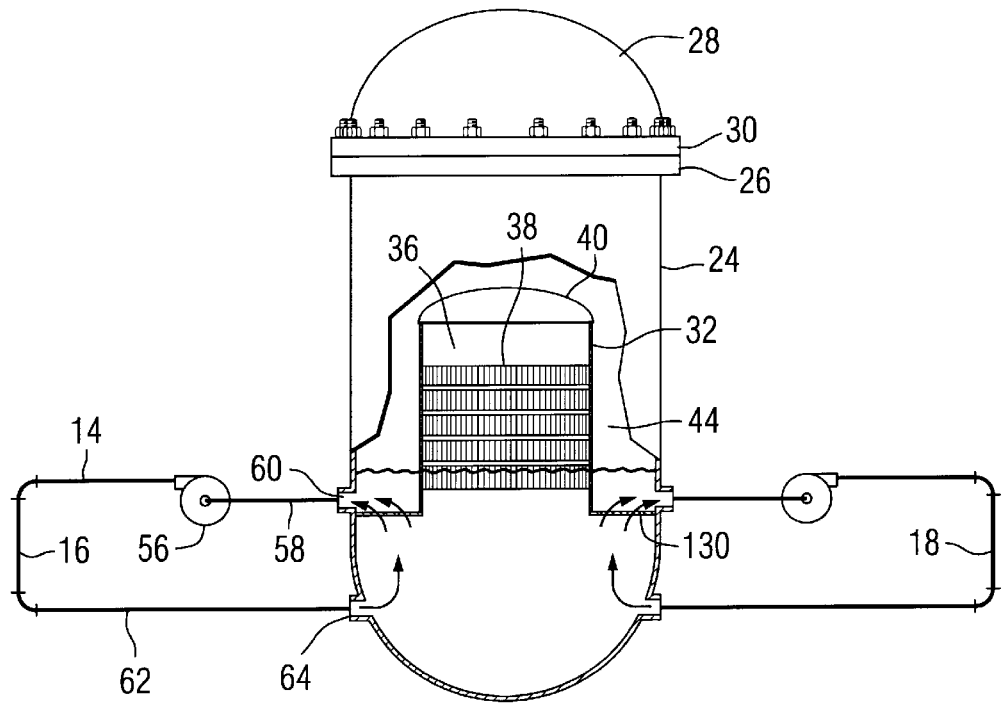
FIG. 8 is a schematic representation of the boiling water reactor vessel of FIG. 1 including a modification for practicing the present invention.

FIG. 8 illustrates a modification of the reactor pressure vessel 12 of FIG. 1 (which does not employ jet pumps) wherein flow holes in the ring member 42 or in the lower portion of the core shroud 32 below the core plate 34 would permit decontamination solution in the lower internals region 46 to circulate into the annulus region 44 without circulating through the central core region 36. The flow holes could be uncovered annulus manways 130 and/or flow holes cut into the ring member 42 or in the lower part of the core shroud 32 (or, equivalently, its supporting skirt) below the core plate 34.

With each of these modifications, additional plant pumps could be operated to circulate the decontamination solution through appurtent systems if needed. For example, Reactor Water Clean-Up, Residual Heat Removal, High Pressure System Injection, Low Pressure System Injection Systems and others could be decontaminated if desired.

Entrained particulates and activated ions in the circulating decontamination solutions may be removed in filters (not shown) and on cation resins (not shown), respectively, during the course of the decontamination operations. Then, at the conclusion of the decontamination operations, the primary coolants may be cleaned up on the resins. If plants are to be decommissioned, decommissioning operations may continue without restoring the reactor pressure vessels to their initial conditions. However, if plants are to be returned to online power generating operations, then pressure vessels may need to be repaired or further modified.

While a present preferred embodiment of the present invention has been shown and described, it is to be understood that the invention may be otherwise variously embodied within the scope of the following claims of invention.

What is claimed is:

1. A method of decontaminating a boiling water nuclear reactor having a plurality of reactor recirculation loops hydraulically connected in parallel with a reactor pressure vessel, the reactor pressure vessel having (i) a central core region, (ii) an annulus region surrounding the central core region and in hydraulic communication with the reactor recirculation loops and (iii) a lower internals region in hydraulic communication with the central core region, comprising the step of:

circulating a decontamination solution through at least one of the reactor recirculation loops and the annulus region of the pressure vessel without circulating the decontamination solution through the central core region.

2. The method of claim 1, including the step of:

providing flow passageways between the annulus region and the lower internals region by opening annulus manholes or cutting openings in internal members separating the annulus region and the lower internal region; and then circulating the decontamination solution from the lower internals region through the provided flow passageways into the annulus region while circulating the decontamination solution between the annulus region and the reactor recirculation loop without circulating the decontamination solution through the core region.

3. A method of decontaminating a boiling water nuclear reactor having a plurality of reactor recirculation loops hydraulically connected in parallel with a reactor pressure vessel, the reactor pressure vessel having:
- a central core region;
- an annulus region surrounding the central core region and in hydraulic communication with the reactor recirculation loops;
- a lower internals region in hydraulic communication with the central core region; and
- a plurality of jet pump assemblies disposed in the annulus region; each jet pump assembly including (i) inlet piping with a jet pump nozzle in fluid flow communication with one of the reactor recirculation loops, (ii) a mixing assembly having a suction inlet end in fluid flow communication with the annulus region spaced from the jet pump nozzle and (iii) a diffuser assembly having an outlet end in fluid flow communication with the lower internals region;
  - the method comprising the steps of:
    - removing at least part of one jet pump assembly from the reactor pressure vessel;
    - capping the part of the jet pump assembly remaining in the reactor pressure vessel which is in fluid flow communication with the lower internals region for at least restricting fluid flow between the annulus region and the lower internals region; and then
    - circulating a decontamination solution through at least one of the reactor recirculation loops and the annulus region of the pressure vessel without circulating the decontamination solution through the central core region.

4. The method of claim 3, wherein the flow of the decontamination solution between the annulus region and the lower internals region is prevented while circulating the decontamination solution through the reactor recirculation loop and the annulus region without circulating the decontamination solution through the core region.

5. The method of claim 3, wherein the suction inlet end of the mixing assembly is removed from the reactor vessel while retaining a portion of the mixing assembly and the diffuser assembly in the reactor pressure vessel.

6. The method of claim 3, wherein the mixing assembly is removed from the reactor vessel while retaining the diffuser assembly in the reactor pressure vessel.

7. The method of claim 3, wherein a part of the diffuser assembly is removed from the reactor pressure vessel.

8. The method of claim 3, wherein a decontamination solution is circulated through all of the reactor recirculation loops and the annulus region of the pressure vessel without circulating the decontamination solution through the core region.

9. The method of claim 8, wherein the decontamination solution is circulated from the lower internals region to the annulus region.

10. A method of decontaminating a boiling water nuclear reactor having a plurality of reactor recirculation loops hydraulically connected in parallel with a reactor pressure vessel, the reactor pressure vessel having:
- a central core region;
- an annulus region surrounding the central core region and in hydraulic communication with the reactor recirculation loops;
- a lower internals region in hydraulic communication with the central core region;
- a plurality of jet pump assemblies disposed in the annulus region; each jet pump assembly including (i) inlet piping with a jet pump nozzle in fluid flow communication with one of the reactor recirculation loops, (ii) a mixing assembly having a suction inlet end in fluid flow communication with the annulus region spaced from the jet pump nozzle and (iii) a diffuser assembly having an outlet end in fluid flow communication with the lower internals region;
  - the method comprising the steps of:
    - removing at least part of one jet pump assembly from the reactor pressure vessel while retaining at least one other jet pump assembly in the reactor pressure vessel; and then
    - circulating a decontamination solution through at least one of the reactor recirculation loops and the annulus region of the pressure vessel without circulating the decontamination solution through the central core region; and
    - circulating decontamination solution from the lower internals region into the annulus region while circulating the decontamination solution between the annulus region and the reactor recirculation loop without circulating the decontamination solution through the core region.

11. A method of decontaminating a boiling water nuclear reactor having a plurality of reactor recirculation loops hydraulically connected in parallel with a reactor pressure vessel, the reactor pressure vessel having (i) a central core region, (ii) an annulus region surrounding the central core region and containing inlet piping and jet pump nozzles in hydraulic communication with the reactor recirculation loops and (iii) a lower internals region in hydraulic communication with the central core region, comprising the step of:
- connecting a jumper pipe or hose between the inlet piping or jet pump nozzle of one reactor recirculation loop with the inlet piping or jet pump nozzle of another reactor recirculation loop; and then
- circulating a decontamination solution through the jumper pipe or hose from the one recirculation loop into the other recirculation loop while circulating the decontamination solution through the annulus region without circulating the decontamination solution through the core region.

* * * * *